US008763031B2

(12) United States Patent
Xu (10) Patent No.: US 8,763,031 B2
(45) Date of Patent: Jun. 24, 2014

(54) METHOD AND SYSTEM FOR MANAGING PROGRAM IN WORD SERVICE OF VIDEO PROGRAM

(75) Inventor: Shaoping Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 142 days.

(21) Appl. No.: 13/509,142

(22) PCT Filed: Jul. 9, 2010

(86) PCT No.: PCT/CN2010/075092
§ 371 (c)(1),
(2), (4) Date: May 10, 2012

(87) PCT Pub. No.: WO2010/149116
PCT Pub. Date: Dec. 29, 2010

(65) Prior Publication Data
US 2012/0240166 A1     Sep. 20, 2012

(30) Foreign Application Priority Data

Nov. 11, 2009  (CN) .......................... 2009 1 0221654

(51) Int. Cl.
*H04N 7/10*     (2006.01)
*H04N 7/025*    (2006.01)
(52) U.S. Cl.
USPC .............. 725/32; 725/34; 725/105; 725/117; 715/758; 709/204
(58) Field of Classification Search
USPC ..................................... 725/32, 34
See application file for complete search history.

(56) References Cited

U.S. PATENT DOCUMENTS 6,081,830 A * 6/2000 Schindler ...................... 709/204
6,519,771 B1 * 2/2003 Zenith ............................ 725/32
(Continued)

FOREIGN PATENT DOCUMENTS

CN      1322439 A    11/2001
CN    101098329 A     1/2008
(Continued)

OTHER PUBLICATIONS

International Preliminary Report on Patentability for International Application No. PCT/CN2010/075092, issued May 15, 2012 (6 pages).
(Continued)

*Primary Examiner* — Robert Hance
(74) *Attorney, Agent, or Firm* — Clark & Elbing LLP (57) ABSTRACT

The present invention claims a method and a system for managing a Program In Word (PIW) service of a video program. The method comprises the steps of: a management platform configuring a sub-program to bear the PIW service for a program provided by the operator, and sending a corresponding relation between the program and the sub-program to an EPG server for storing; the EPG server storing text information input for the program by all users as PIW display information of the corresponding sub-program, and updating the PIW display information in real time; an STB forwarding a PIW service request of a user to the EPG server; according to program information, which is carried in the PIW service request, of a currently playing program, the EPG server obtaining the sub-program corresponding to the currently playing program by inquiry, and then obtaining the PIW display information of the sub-program and sending the PIW display information to the STB; and the STB displaying the PIW display information on a client terminal for the user. The present invention enables the users to submit comments on the program when they are watching it, and the PIW display information can be updated continuously and displayed in real time.

10 Claims, 4 Drawing Sheets

(56) References Cited

U.S. PATENT DOCUMENTS

| | | | |
|---|---|---|---|
| 7,036,083 | B1 | 4/2006 | Zenith |
| 7,143,428 | B1 * | 11/2006 | Bruck et al. .................... 725/37 |
| 2001/0007960 | A1 * | 7/2001 | Yoshihara et al. .............. 700/94 |
| 2002/0026645 | A1 * | 2/2002 | Son et al. ...................... 725/117 |
| 2002/0087984 | A1 * | 7/2002 | Maeda et al. ................... 725/39 |
| 2003/0182663 | A1 | 9/2003 | Gudorf et al. |
| 2004/0231003 | A1 * | 11/2004 | Cooper et al. ................ 725/135 |
| 2006/0130109 | A1 | 6/2006 | Zenith |
| 2006/0140169 | A1 | 6/2006 | Soundararajan |
| 2008/0201751 | A1 * | 8/2008 | Ahmed et al. ................ 725/109 |

FOREIGN PATENT DOCUMENTS

| | | |
|---|---|---|
| CN | 101702766 A | 5/2010 |
| WO | WO 01/24524 | 4/2001 |
| WO | WO 2004/056119 | 7/2004 |
| WO | WO 2008/003248 | 1/2008 |

OTHER PUBLICATIONS

International Search Report for International Application No. PCT/CN2010/075092, mailed Oct. 21, 2010 (5 pages).

Written Opinion of the International Searching Authority for International Application No. PCT/CN2010/075092, mailed Oct. 21, 2010 (5 pages).

* cited by examiner

METHOD AND SYSTEM FOR MANAGING PROGRAM IN WORD SERVICE OF VIDEO PROGRAM

CROSS-REFERENCE TO RELATED APPLICATIONS

This application is the U.S. National Stage filing under 35 U.S.C. §371 of International Application No. PCT/CN2010/075092, filed Jul. 9, 2010, which claims the benefit of Chinese Patent Application No. 200910221654.6, filed Nov. 11, 2009.

FIELD OF THE INVENTION

The present invention relates to the Internet Protocol Television (IPTV) technology, in particular to a method and a system for managing a Program In Word (PIW) service of a video program.

BACKGROUND OF THE INVENTION to The IPTV is a brand new technology that utilizes a series of Internet protocols to bear and transmit compressed and encoded multimedia digital signals to provide family users with multiple interactive digital multimedia services and value-added services comprising TV programs, by taking a broadband network as infrastructure and taking a household television set or a Personal Computer (PC) as the main display terminal. People can enjoy the IPTV service through various ways, such as a PC, a Set Top Box (STB) plus a television, and a multimedia mobile phone (used for mobile IPTV). From a user's perspective, the IPTV service can provide the personalized and real-time interactive program service different from the non-interactive broadcast service of the traditional television.

In the current IPTV system, the operation mode of the programs is that the user initiates switch of the programs on the STB according to an Electronic Program Guide (EPG), and the STB switches the programs after receiving the request. This mode is still in a passive watching mode of the traditional television, and cannot realize a function of interactive network television through which the user can chat while watching at any time and in any place.

SUMMARY OF THE INVENTION

The present invention provides a method and a system for managing a PIW service of a video program which enable a user to submit comments on the program when they are watching the program.

In order to solve the technical problem, the present invention provides a method for managing a PIW service of a video program, comprising:

a Server Manager System (SMS) configuring, according to a request of an operator, a sub-program to bear the PIW service for a program of the operator, and sending a corresponding relation between the program and the sub-program to an Electronic Program Guide (EPG) server for storing; the EPG server storing text information input for the program by all users as PIW display information of the corresponding sub-program, and updating the PIW display information in real time;

an STB forwarding a PIW service request of a user to the EPG server; according to program information, which is carried in the PIW service request, of a currently playing program, the EPG server obtaining the sub-program corresponding to the currently playing program by inquiry, and obtaining the PIW display information of the sub-program and sending the PIW display information to the STB; the STB displaying the PIW display information for the user through a client terminal.

Preferably, after the step of the STB forwarding the PIW service request of the user to the EPG server, the EPG server retrieving a program list according to the program information, which is carried in the PIW service request, of the currently playing program, wherein the program list is configured and sent to the EPG server by the SMS, and the program list is configured with the corresponding relation between the program and the sub-program; the EPG server inquiring the PIW display information of the sub-program in a program information table according to a sub-program number, retrieved in the program list, of the sub-program corresponding to the currently playing program, wherein the program information table stores the sub-program number in the program list and the PIW display information corresponding to the sub-program number.

Preferably, the steps of storing the text information input for the program by all the users as the PIW display information of the sub-program and updating the PIW display information in real time comprises: after a user inputs information, the STB forming an event message according to the information input by the user, sending the event message to the EPG server, and simultaneously submitting the program information of the currently playing program as a parameter to the EPG server; the EPG server receiving the event message, parsing the event message to obtain the information input by the user carried in the event message, searching the program list, according to the program information of the currently playing program, to obtain the corresponding sub-program number, then searching a corresponding storage location in the program information table according to the sub-program number, inserting the information input by the user and then storing to update; the EPG server returning the updated PIW display information, which contains the information input by the user, back to the STB, and the STB displaying the retuned PIW display information, which contains the information input by the user, on the client terminal for the user.

Preferably, the STB re-registering key values for keys on a remote controller in a PIW state, for the user to input information; after receiving the PIW service request of the user, the STB shielding original functions of the keys on the remote controller and automatically switching to the re-registered key values in the PIW state, and transmitting corresponding signals to the STB.

Preferably, when displaying the PIW display information on the client terminal for the user, the STB starting an internal browser of the STB to superpose a page for displaying the PIW display information with a page of the currently playing video program to display in a way of superposing page with video; when displaying the PIW display information on the client terminal for the user, the STB also starting a timer, and sending, after the timer expires, a refreshing request to the EPG server to synchronize the latest PIW display information of the sub-program.

Preferably, the STB displaying the PIW display information on a page at different layers, wherein an upper layer is used to display PIW output by the STB currently, and a lower layer is provided for the user to input information through a remote controller.

In order to solve the technical problem, the present invention also provides a system for managing a PIW service of a video program, comprising a management platform (also referred to as Server Manager System, SMS), an EPG server and an STB, wherein the SMS is used for configuring, according to a request of an operator, a sub-program to bear the PIW service for a program of the operator, and informing the EPG server of a configured corresponding relation between the program and the sub-program;

the EPG server is used for storing the corresponding relation between the program and the sub-program, storing text information input for the program by all users as PIW display information of the corresponding sub-program, and updating the PIW display information in real time; the EPG server is further used for, according to program information, which is carried in a PIW service request, of a currently playing program, inquiring the sub-program corresponding to the currently playing program, inquiring the PIW display information of the sub-program, and returning the PIW display information back to the STB; and the STB is used for forwarding the PIW service request submitted by a user to the EPG server, and displaying the PIW display information for the user through a client terminal.

Preferably, the SMS is further used for configuring a program list which stores the corresponding relation between the program and the sub-program, and sending the program list to the EPG server;

the EPG server is further used for receiving and storing the program list, establishing and maintaining a program information table which stores a sub-program number in the program list and the PIW display information corresponding to the sub-program number, retrieving, in the program list, the sub-program number of the sub-program corresponding to the currently playing program according to the program information, which is carried in the PIW service request, of the currently playing program, and inquiring, in the program information table, the PIW display information of the sub-program according to the sub-program number.

Preferably, the STB is further used for forming an event message according to information input by the user, sending the event message to the EPG server, and simultaneously submitting the program information of the currently playing program, as a parameter, to the EPG server;

the EPG server is further used for receiving the event message, parsing the event message to obtain the information input by the user carried in the event message, and searching the program list, according to the program information of the currently playing program, to obtain the corresponding sub-program number, then searching a corresponding storage location in the program information table according to the sub-program number, inserting the information input by the user and then storing to update; besides, the EPG server is further used for returning the updated PIW display information, which contains the information input by the user, back to the STB;

the STB is further used for displaying the retuned PIW display information, which contains the information input by the user, on the client terminal for the user.

Preferably, the STB is further used for re-registering key values for keys on a remote controller in a PIW state, and after receiving the PIW service request submitted by the user, shielding original functions of the keys on the remote controller and automatically switching to the re-registered key values in the PIW state.

Preferably, the STB is further used for superposing a page for displaying the PIW display information with a page of the currently playing video program to display in a way of superposing page with video; when displaying the PIW display information on the client terminal for the user, the STB is further used for starting a timer, and sending, after the timer expires, a refreshing request to the EPG server to synchronize the latest PIW display information of the sub-program.

Preferably, the STB is further used for displaying the PIW display information on a page at different layers, wherein an upper layer is used for displaying PIW output by the STB currently, and a lower layer is provided for the user to input information through a remote controller.

The beneficial effects of the present invention are as follows:

the present invention enables the users to submit comments on the program when they are watching it, thereby realizing the function of interactive network television anywhere, anytime; the PIW display information is updated continuously and displayed in real time in the way of superposing pages, thereby really realizing the real-time interaction, enhancing user experience, and enabling the user to continue watching the video while watching the PIW information.

DETAILED DESCRIPTION OF THE EMBODIMENTS

The core of the present invention is that: an SMS configures a sub-program to bear a PIW service for a program of an operator according to a request of the operator, and informs the EPG server of a corresponding relation between the program and the sub-program; the EPG stores the corresponding relation between the program and the sub-program, and stores text information input for the sub-program by all users as the PIW display information of the sub-program, and updates the PIW display information in real time;

the STB forwards a PIW service request of a user to the EPG server; according to program information, which is carried in the PIW service request, of a currently playing program, the EPG server obtains the sub-program corresponding to the currently playing program by inquiry, and then obtains the PIW display information of the sub-program and returns the PIW display information back to the STB; and the STB displays the PIW display information on a client terminal for the user.

Related configurations are performed in the SMS in advance.

When configuring the program, the SMS can configure an association for each program of the operator according to the request of the operator. For example, the program 1 is configured with a sub-program whose mark number is 10001, and the program 10001 is used for bearing the PIW display information and associated with the program 1. Thus, opening the PIW page is actually starting the program 10001, and what is displayed in the program 10001 is the text information. The SMS stores the configured association between the program and the sub-program as a program list, and continuously maintains and updates the program list in real time.

The SMS sends the configured program list to the EPG server; thus, when the request is sent by the user, it is required to carry the program information of the video program that the user is currently watching, except carrying the event message to indicate the action; the EPG server searches in the program list that is sent by the SMS, according to the program information; if the requested program is not configured with a bound sub-program, then the PIW cannot be displayed when the program wants to open it.

Related configurations are also performed in the EPG server.

In the EPG server, a program information table is maintained according to the program list that is sent by the SMS, wherein the PIW display information of the sub-program is correspondingly stored according to the sub-program in the program list, and is maintained and updated continuously according to the input information of the user.

When the user sends the request, the EPG server finds out the bound sub-program in the program list according to the program information carried in the request, and then inquires the PIW display information of the sub-program in the program information table.

After the user inputs the information, the program information is submitted, as a parameter, to the EPG server; the EPG server finds out the bound sub-program in the program list according to the program information, and then adds, in the program information table, the information input by the user to a location corresponding to the sub-program.

Related configurations are also performed in the STB.

In the STB, it is required to configure key values of a remote controller in a PIW state; the key values are re-registered in the PIW state for the original common play controlling functions of the keys on the remote controller, and are mainly used for the user to input information.

After entering the PIW state, the original common play controlling functions of the keys on the remote controller will be shielded and automatically switched to the re-registered key values in the PIW state; only the registered key values can transmit corresponding control signals to the STB.

Figure 1:
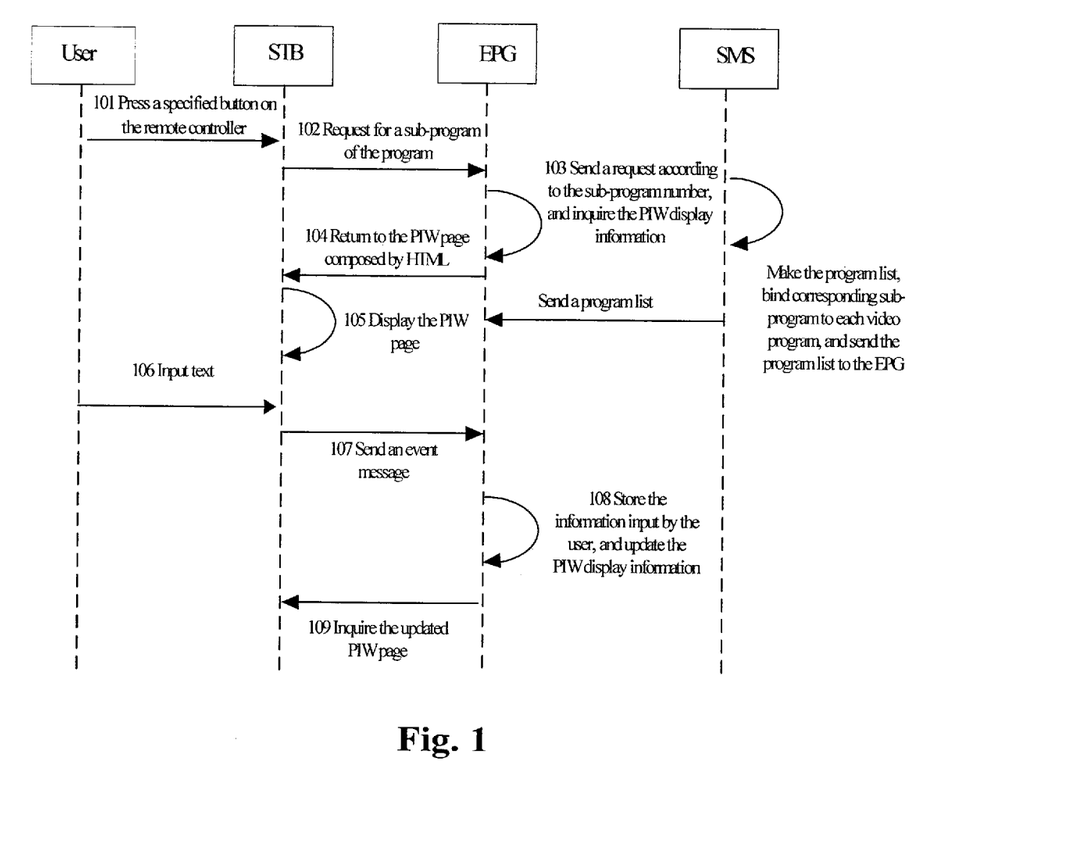
FIG. 1 shows a flow sequence diagram of performing a PIW service in accordance with an embodiment of the present invention.

The method of the present invention is described below with reference to an embodiment. FIG. 1 shows a flow sequence diagram of performing the PIW service, and the flow comprises the following steps:

Step 101: in the process of playing a video by an STB, a user presses a specified button, e.g. sub-program inquiry/F4, on a remote controller to request to play a sub-program of the current video program, wherein the sub-program is used for bearing a PIW page;

Step 102: the STB receives an infrared execution control logic that is sent through the remote controller by the user, and then sends a request to the EPG server to request to play the PIW of the current video program, and submits the program information of the currently playing video program and user information, as parameters, to the EPG server;

wherein the STB forms an event message according to the 'consulting' infrared signal submitted through the remote controller by the user, and carries the event message in the request when the STB sends the request to the EPG server;

Step 103: the EPG server obtains the PIW display information, e.g. a URL link address of the PIW, of the current video program that the user inquires, according to the event message and the program information carried in the request sent by the STB and the configuration information (mainly the configured program list) sent by the SMS;

Step 104: the EPG server returns an HTML-based PIW page back to the STB, wherein the HTML-based PIW page is generated according to the obtained display information, for example, the URL link address of the PIW;

Step 105: the STB starts its internal browser to display the PIW page in the way of superposing page with video, that is to say, the PIW page and the currently playing video program are superposed together to display;

after the PIW page is opened, the STB starts a timer, and after the timer expires, sends a request to the EPG server to synchronize the latest PIW display information; when the PIW page is closed, the timer is cancelled;

Step 106: the user uses the remote controller to move the focus to an input box of the PIW part in the page that is displayed in the superposition way, and uses the remote controller to input information;

Step 107: after the user inputs information, the STB forms the event message according to the information input by the user, and sends the event message to the EPG server;

Step. 108: the EPG server receives the event message, parses the event message to obtain the information input by the user carried in the event message, and stores the information input by the user in the EPG server table;

Step 109: the EPG server returns the updated data, which contains the information input by the user, back to the STB, and then the STB displays the returned data, which contains the information input by the user, on the client terminal for the user, as the PIW;

when the user presses a close button, the STB closes the PIW on the client terminal, and the process is ended.

The present invention is described below with reference to an example.

Figure 2:
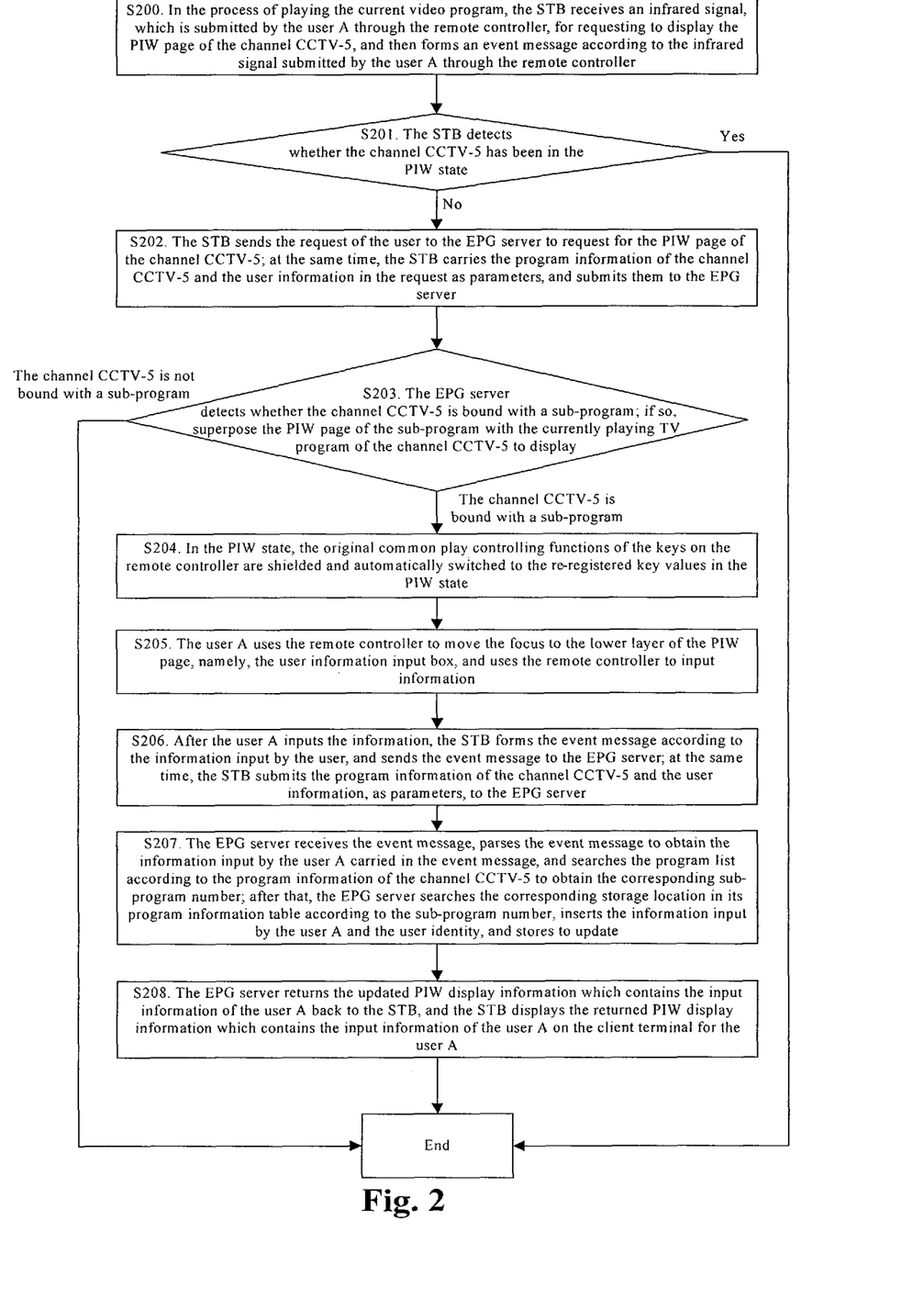
FIG. 2 shows a flowchart of the whole method in accordance with an embodiment of the present invention.

When watching a certain program of a channel CCTV-5, a user A selects to inquire, through a remote controller, comments on the program of the channel CCTV-5 submitted by all users. FIG. 2 shows a flowchart of the method, comprising the steps as follows.

Step S200: in the process of playing the current video program, the STB receives an infrared signal, which is submitted by the user A through the remote controller, for requesting to display the PIW page of the channel CCTV-5, and then forms an event message according to the infrared signal submitted by the user A through the remote controller.

Step S201: the STB detects whether the channel CCTV-5 has been in the PIW state, if not, execute Step S202, if so, it is not allowed to open the PIW page in the current state again, and the process is ended.

Step S202: the STB sends the request of the user to the EPG server to request for the PIW page of the channel CCTV-5, at the same time, the STB carries the program information of the channel CCTV-5 and the user information in the request as parameters and submits them to the EPG server.

Step S203: the EPG server detects whether the channel CCTV-5 is bound with a sub-program; if it is found by detecting that the channel CCTV-5 is not configured with a bound sub-program, then the PIW cannot be displayed, and the process is ended; if it is found by detecting that the channel CCTV-5 is configured with a bound sub-program, then the PIW page of the sub-program and the currently playing TV program of the channel CCTV-5 are superposed to display.

Figure 3:
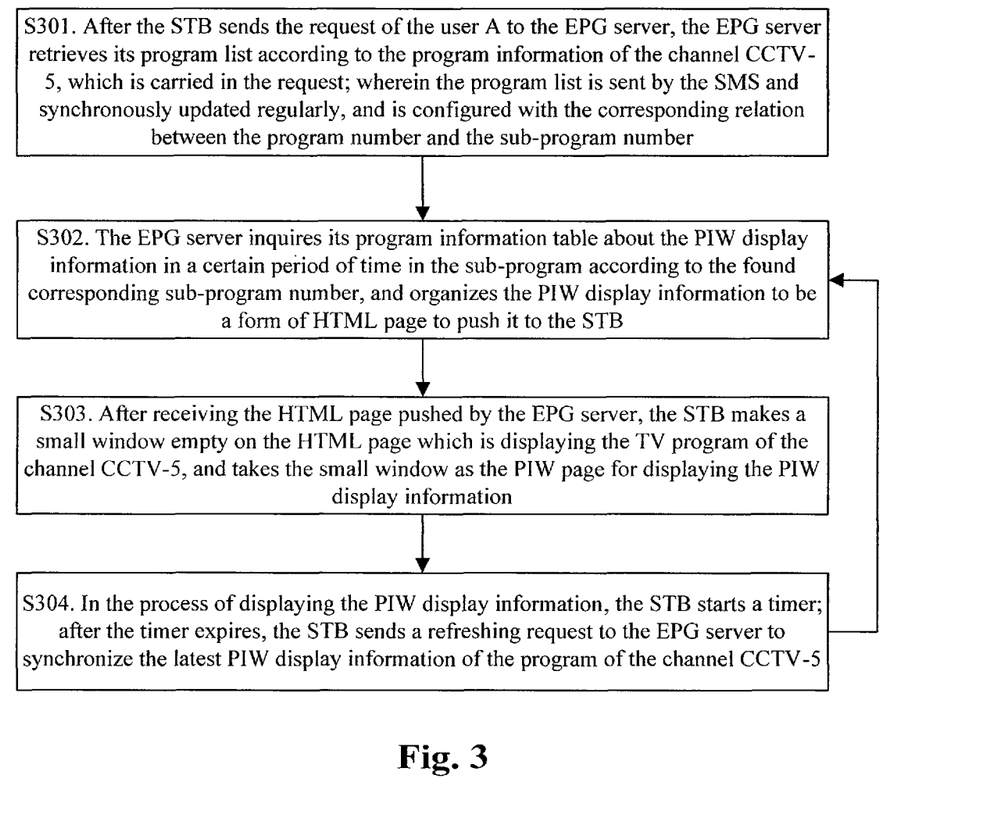
FIG. 3 shows a flowchart of obtaining PIW display information in accordance with an embodiment of the present invention.

As shown in FIG. 3, Step S203 specifically executes the following operations:

Step S301: after the STB sends the request of the user A to the EPG server, the EPG server retrieves the program list of the EPG server according to the program information (e.g. program number) of the channel CCTV-5 which is carried in the request; wherein the program list is sent by the SMS and synchronously updated regularly, and is configured with the corresponding relation between the program number and the sub-program number.

If the EPG server does not find out the corresponding sub-program number existing in the program list according to the program number of the channel CCTV-5, then it means the channel CCTV-5 is not configured with the sub-program, that is to say, the PIW service is not opened; the EPG server feeds the information back to the STB, and the STB informs, on the client terminal, the user A of not displaying the PIW page, and then the process is ended. If the EPG server finds out the corresponding sub-program number in the program list according to the program number of the channel CCTV-5, then execute Step S302.

Step S302: the EPG server inquires its program information table about the PIW display information in a certain period of time in the sub-program according to the found corresponding sub-program number, and organizes the PIW display information to be a form of HTML page to push it to the STB;

the certain period of time can be the length of time from the moment that the last timer expires to the moment that the current request occurs, and can also be a fixed length of time defined by the system.

Step S303: after receiving the HTML page pushed by the EPG server, the STB makes a small window empty on the HTML page which is displaying the TV program of the channel CCTV-5, and takes the small window as the PIW page for displaying the PIW display information;

wherein the PIW page can be displayed at two layers; the upper layer is used for displaying output, specifically, displaying the PIW output by the STB currently; the lower layer is used for the user to input, specially, it can be provided for the user to utilize a soft keyboard of the remote controller to input the user information to the STB, and then the user information is sent to the EPG server through the STB.

Step S304: in the process of displaying the PIW display information, the STB starts a timer; after the timer expires, the STB sends a refreshing request to the EPG server to synchronize the latest PIW display information of the program of the channel CCTV-5, and then return to execute Step S302;

at this moment, the comments on the program of the channel CCTV-5 submitted by all users are displayed on the PIW page, wherein the comments include the comments on the program that the user A is watching; if the user A also hopes to add comment on the program that he/she is watching, then the steps as follows are executed.

Step S204: in the PIW state, the original common play controlling functions of the keys on the remote controller are shielded and automatically switched to re-registered key values in the PIW state;

only the registered key values can transmit corresponding control signals to the STB.

Step S205: the user A uses the remote controller to move the focus to the lower layer of the PIW page, namely, the user information input box, and uses the remote controller to input information.

Step S206: after the user A inputs the information, the STB forms an event message according to the information input by the user, and sends the event message to the EPG server; at the same time, the STB submits the program information of the channel CCTV-5 and the user information, as parameters, to the EPG server.

Step S207: the EPG server receives the event message, parses the event message to obtain the information input by the user A carried in the event message, and searches the program list according to the program information of the channel CCTV-5 to obtain the corresponding sub-program number; after that, the EPG server searches the corresponding storage location in the program information table of the EPG server according to the sub-program number, inserts the information input by the user A and the user identity, and stores to update.

Step S208: the EPG server returns the updated PIW display information, which contains the information input by the user A, back to the STB, and the STB displays the returned PIW display information, which contains the input information of the user A, on the client terminal for the user A;

when the user A presses the close button, the STB closes the PIW on the client terminal, and the process is ended.

Figure 4:
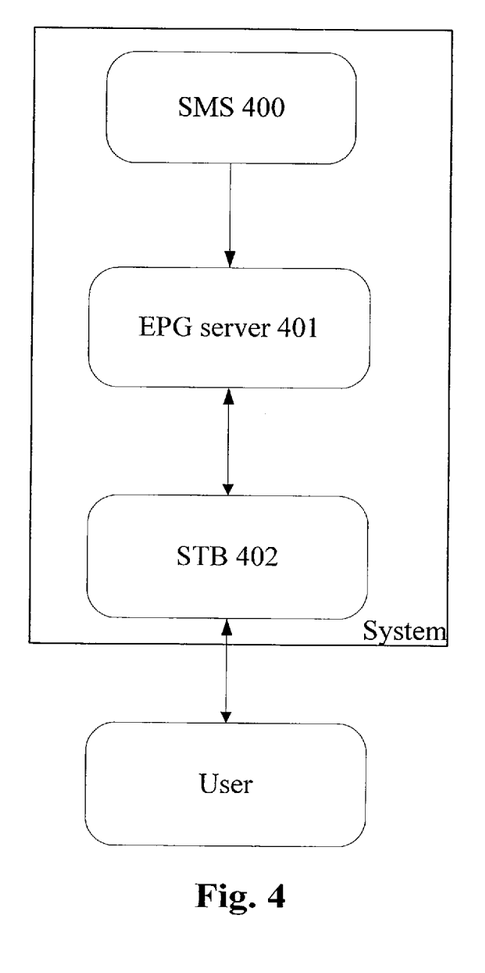
FIG. 4 shows a structure diagram of a system in accordance with an embodiment of the present invention.

FIG. 4 shows a structure diagram of a system for managing the PIW service of video program of the present invention. As shown in FIG. 4, the system comprises an SMS 400, an EPG server 401 and an STB 402.

The SMS 400 is used for configuring a sub-program to bear the PIW service for a program of an operator according to a request of the operator, storing the configured corresponding relation between the program and the sub-program as a program list, and sending the program list to the EPG server 401.

The EPG server 401 is used for storing the program list recording the corresponding relation between the program and the sub-program, storing text information input for the program by all users as PIW display information of the corresponding sub-program, and updating the PIW display information in real time; during implementation, the EPG server 401 is used for establishing and maintaining a program information table to store a sub-program number in the program list and the PIW display information corresponding to the sub-program number; the EPG server 401 is further used for retrieving, in the program list, the sub-program number of the sub-program corresponding to the currently playing program according to the program information, which is carried in the PIW service request, of the currently playing program, and then inquiring the PIW display information of the sub-program in the program information table according to the sub-program number, and returning the PIW display information back to the STB 402.

The EPG server 401 is further used for receiving an event message, parsing the event message to obtain the information input by the user and carried in the event message, and searching the program list, according to the program information of the currently playing program, to obtain the corresponding sub-program number, and then searching the corresponding storage location in the program information table according to the sub-program number, inserting the information input by the user and storing to update; besides, the EPG server is further used for returning the updated PIW display information, which contains the input information of the user, back to the STB 402.

The STB 402 is used for forwarding the PIW service request submitted by the user to the EPG server 401; the STB 402 is further used for forming the event message according to the information input by the user, sending the event message to the EPG server 401, and simultaneously submitting the program information of the currently playing program to the EPG server 401 as a parameter; the STB 402 is further used for displaying the PIW display information on the client terminal for the user.

The STB 402 is further used for re-registering key values for keys on the remote controller in the PIW state, and after receiving the PIW service request submitted by the user, shielding the original functions of the keys on the remote controller and automatically switching to the re-registered key values in the PIW state.

The STB 402 is further used for superposing a page for displaying the PIW display information with a page of the currently playing video program to display in the way of superposing page with video; the STB 402 is further used for displaying the PIW display information on the page at different layers, wherein an upper layer is used for displaying the PIW output by the STB currently, and a lower layer is provided for the user to input information through the remote controller; when displaying the PIW display information on the client terminal for the user, the STB 402 is further used for starting a timer, and after the timer expires, sending a refreshing request to the EPG server 401 to synchronize the latest PIW display information of the sub-program.

The illustration above presents and describes preferable embodiments of the present invention; but as mentioned above, it should be understood that the present invention is not limited to the forms disclosed in the specification; the preferable embodiments are not intended to exclude other embodiments, can be applied to other combinations, modifications and environments, and can be modified through the above-mentioned instruction or the technology or knowledge in related art without departing from the scope of conception of the present invention. The various modifications and changes performed by those skilled in the art do not depart from the spirit and scope of the present invention, and shall fall within the scope of the claims of the present invention.

What is claimed is:

1. A method for managing a Program In Word (PIW) service of a video program, the method comprising:
   a Server Manager System (SMS) configuring, according to a request of an operator, a sub-program to bear the PIW service for a program of the operator, and sending a corresponding relation between the program and the sub-program to an Electronic Program Guide (EPG) server; the EPG server storing text information input for the program by all users as PIW display information of the corresponding sub-program, and updating the PIW display information in real time, wherein the steps of storing the text information input for the program by all the users as the PIW display information of the sub-program and updating the PIW display information in real time comprises:
   after a user inputs information, the STB forming an event message according to the information input by the user, sending the event message to the EPG server, and simultaneously submitting program information of a currently playing program as a parameter to the EPG server;
   the EPG server receiving the event message, parsing the event message to obtain the information input by the user carried in the event message, searching a program list, according to the program information of the currently playing program, to obtain a corresponding sub-program number, then searching a corresponding storage location in a program information table according to the sub-program number, inserting the information input by the user and then storing to update;
   the EPG server returning the updated PIW display information, which contains the information input by the user, back to the STB, and the STB displaying the retuned PIW display information, which contains the information input by the user, on a client terminal for the user, wherein the program list is configured and sent to the EPG server by the SMS, and the program list is configured with the corresponding relation between the program and the sub-program;
   a Set Top Box (STB) forwarding a PIW service request of a user to the EPG server; according to program information, which is carried in the PIW service request, of a currently playing program, the EPG server obtaining the sub-program corresponding to the currently playing program by inquiry, and obtaining the PIW display information of the sub-program and sending the PIW display information to the STB; the STB displaying the PIW display information for the user through a client terminal; the method further comprising:
   after the step of the STB forwarding the PIW service request of the user to the EPG server, the EPG server retrieving the program list according to the program information, which is carried in the PIW service request, of the currently playing program;
   the EPG server inquiring the PIW display information of the sub-program in the program information table according to a sub-program number, retrieved in the program list, of the sub-program corresponding to the currently playing program, wherein the program information table stores the sub-program number in the program list and the PIW display information corresponding to the sub-program number.

2. The method according to claim 1, further comprising:
   the STB re-registering key values for keys on a remote controller in a PIW state, for the user to input information;
   after receiving the PIW service request of the user, the STB shielding original functions of the keys on the remote controller and automatically switching to the re-registered key values in the PIW state, and transmitting corresponding signals to the STB.

3. The method according to claim 1, further comprising:
   when displaying the PIW display information on the client terminal for the user, the STB starting an internal browser of the STB to superpose a page for displaying the PIW display information with a page of the currently playing video program to display in a way of superposing page with video;
   when displaying the PIW display information on the client terminal for the user, the STB also starting a timer, and sending, after the timer expires, a refreshing request to the EPG server to synchronize the latest PIW display information of the sub-program.

4. The method according to claim 2, further comprising:
   the STB displaying the PIW display information on a page at different layers, wherein an upper layer is used to display PIW output by the STB currently, and a lower layer is provided for the user to input information through a remote controller.

5. The method according to claim 3, further comprising:
   the STB displaying the PIW display information on a page at different layers, wherein an upper layer is used to display PIW output by the STB currently, and a lower layer is provided for the user to input information through a remote controller.

6. A system for managing a Program In Word (PIW) service of a video program, the system comprising a Server Manager System (SMS), an Electronic Program Guide (EPG) server and a Set Top Box (STB), wherein
   the SMS is used for configuring, according to a request of an operator, a sub-program to bear the PIW service for a program of the operator, and informing the EPG server of a configured corresponding relation between the program and the sub-program;
   the EPG server is used for storing the corresponding relation between the program and the sub-program, storing text information input for the program by all users as PIW display information of the corresponding sub-program, and updating the PIW display information in real time; the EPG server is further used for, according to program information, which is carried in a PIW service request, of a currently playing program, inquiring the sub-program corresponding to the currently playing program, inquiring the PIW display information of the sub-program, and returning the PIW display information back to the STB;

the STB is used for forwarding the PIW service request submitted by a user to the EPG server, and displaying the PIW display information for the user through a client terminal;

the SMS is further used for configuring a program list which stores the corresponding relation between the program and the sub-program, and sending the program list to the EPG server;

the EPG server is further used for receiving and storing the program list, establishing and maintaining a program information table which stores a sub-program number in the program list and the PIW display information corresponding to the sub-program number, retrieving, in the program list, the sub-program number of the sub-program corresponding to the currently playing program according to the program information, which is carried in the PIW service request, of the currently playing program, and inquiring, in the program information table, the PIW display information of the sub-program according to the sub-program number;

the STB is further used for forming an event message according to information input by the user, sending the event message to the EPG server, and simultaneously submitting the program information of the currently playing program, as a parameter, to the EPG server;

the EPG server is further used for receiving the event message, parsing the event message to obtain the information input by the user carried in the event message, and searching the program list, according to the program information of the currently playing program, to obtain the corresponding sub-program number, then searching a corresponding storage location in the program information table according to the sub-program number, inserting the information input by the user and then storing to update; besides, the EPG server is further used for returning the updated PIW display information, which contains the information input by the user, back to the STB;

the STB is further used for displaying the retuned PIW display information, which contains the information input by the user, on the client terminal for the user.

7. The system according to claim 6, wherein the STB is further used for re-registering key values for keys on a remote controller in a PIW state, and after receiving the PIW service request submitted by the user, shielding original functions of the keys on the remote controller and automatically switching to the re-registered key values in the PIW state.

8. The system according to claim 6, wherein the STB is further used for superposing a page for displaying the PIW display information with a page of the currently playing video program to display in a way of superposing page with video; when displaying the PIW display information on the client terminal for the user, the STB is further used for starting a timer, and sending, after the timer expires, a refreshing request to the EPG server to synchronize the latest PIW display information of the sub-program.

9. The system according to claim 7, wherein the STB is further used for displaying the PIW display information on a page at different layers, wherein an upper layer is used for displaying PIW output by the STB currently, and a lower layer is provided for the user to input information through a remote controller.

10. The system according to claim 8, wherein the STB is further used for displaying the PIW display information on a page at different layers, wherein an upper layer is used for displaying PIW output by the STB currently, and a lower layer is provided for the user to input information through a remote controller.

* * * * *